(12) United States Patent
Blickley et al.

(10) Patent No.: US 8,636,138 B2
(45) Date of Patent: Jan. 28, 2014

(54) POLYMER FINISHING PROCESS

(75) Inventors: William J. Blickley, Scott Depot, WV (US); Buddy L. Dearth, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 304 days.

(21) Appl. No.: 13/125,445

(22) PCT Filed: Nov. 23, 2009

(86) PCT No.: PCT/US2009/065532
§ 371 (c)(1),
(2), (4) Date: Apr. 21, 2011

(87) PCT Pub. No.: WO2010/065373
PCT Pub. Date: Jun. 10, 2010

(65) Prior Publication Data
US 2011/0198197 A1    Aug. 18, 2011

Related U.S. Application Data (60) Provisional application No. 61/200,610, filed on Dec. 2, 2008.

(51) Int. Cl.
*G01G 11/08*    (2006.01)
*G01G 11/18*    (2006.01)

(52) U.S. Cl.
CPC ....................................... *G01G 11/18* (2013.01)
USPC ........................................... 198/657; 198/670

(58) Field of Classification Search
USPC ................ 198/657–677; 222/58, 63; 700/240
See application file for complete search history.

(56) References Cited

U.S. PATENT DOCUMENTS

| | | | |
|---|---|---|---|
| 3,801,286 A * | 4/1974 | Anolick et al. | ............... 422/135 |
| 4,395,131 A | 7/1983 | Barlow | |
| 4,524,886 A | 6/1985 | Wilson et al. | |
| 5,044,819 A | 9/1991 | Kilheffer et al. | |
| 5,662,272 A * | 9/1997 | Buquet et al. | ................. 239/325 |
| 5,939,027 A * | 8/1999 | Ruelle | ............................ 422/145 |
| 6,404,344 B1 | 6/2002 | Young | |
| 6,523,721 B1 | 2/2003 | Nomoto et al. | |
| 6,867,270 B2 | 3/2005 | Savatsky et al. | |
| 2009/0008220 A1 * | 1/2009 | Hillebrecht et al. | .......... 198/657 |

OTHER PUBLICATIONS

Abstract of JP06-247532, pub. Sep. 6, 1994.

\* cited by examiner

*Primary Examiner* — Mark A Deuble
(74) *Attorney, Agent, or Firm* — Jennifer A. Schmidt; Kristina Leavitt (57) ABSTRACT

A polymer finishing process including: recovering polymer powder from a polymerization reactor; feeding the polymer powder to an inlet of a mass flow screw conveyor and one or more mass measuring devices for determining a mass of polymer powder within at least a portion of the mass flow screw conveyor; measuring at least one of a mass of the polymer powder in the screw conveyor and a combined mass of the screw conveyor and the polymer powder within the screw conveyor with the one or more mass measuring devices; and determining a mass flowrate of polymer powder through the mass flow screw conveyor based on the at least one of the measured mass of the polymer powder in the mass flow screw conveyor and the measured combined mass. A method of controlling a polymerization process using a mass flow screw conveyor is also disclosed.

9 Claims, 6 Drawing Sheets

FIGURE 6

POLYMER FINISHING PROCESS

CROSS-REFERENCE TO RELATED APPLICATIONS

This application is a National Stage application under 36 U.S.C. §371 of International Application No. PCT/US2009/065532, filed Nov. 23, 2009, that claims the benefit of Ser. No. 61/200,610, filed Dec. 2, 2008, the disclosures of which are incorporated by reference in their entireties.

FIELD OF THE INVENTION

Embodiments disclosed herein relate generally to polymer finishing. More specifically, embodiments disclosed herein relate to a process for polymer finishing including measuring a mass flow rate of a polymer powder. More specifically yet, embodiments disclosed herein relate to a process for polymer finishing including at least one of measuring and controlling the mass flow rate of a polymer powder.

BACKGROUND

Prior to being used in manufacturing, a raw polymerization reaction product, or raw polymer, typically undergoes various processing steps, collectively known as polymer finishing.

For example, FIG. 1 of U.S. Pat. No. 6,867,270 and the related detailed description illustrate one process for a polymerization conducted in a gas phase reactor to produce a raw polymer product. As shown in FIG. 1 from that patent, in gas phase reactors, polymerization may be conducted in a fluidized bed in which the reaction mixture (including a bed of polymer particles, catalyst, reactants and inert gases) may be maintained in a fluidized condition by the continuous upward flow of a fluidizing gas stream from the base of the gas phase reactor 75. Cycle gas may be taken from the top of the reactor 75 through line 135. The circulating cycle gas may be compressed by a compressor 145 and cooled by a heat exchanger 155 before being reintroduced at the base of the reactor 75 as a fluidizing gas stream. The fluidizing gas stream may also contain make-up reactants and inert gases, which can be introduced into line 135 by line 161 and/or line 160. As fresh polymer is produced, polymer product may be withdrawn by one or more discharge outlets 30 disposed in the lower portion of the reactor 75. The polymer product may be transferred into a product chamber 205 and then into a product blow tank 215 which enables the transfer of the polymer product through transfer line 25 into a product purge bin 200.

A similar polymerization process may also be conducted in a liquid phase reactor, such as a solution polymerization reactor. For example, a liquid phase polymerization reaction may be conducted in a fluidized bed in which the reaction mixture (including a bed of polymer particles, catalyst, reactants and solvent) may be maintained in a fluidized condition by the continuous flow of a fluidizing liquid stream. Following the polymerization, the solvent may be recovered from the polymerization product, for example, via flash, centrifuge, or other type of separation. Following separation from the solvent, the polymer product may be withdrawn from the reactor and transferred into a product purge bin, for storage and degassing of the polymer prior to further processing.

In either a liquid phase or a gas phase polymerization reaction system, nitrogen and/or steam may be injected into the purge bin in order to remove reactants and terminate or prevent any continuing polymerization. The polymer product, for example in form of a polymer powder, may then be transferred out of the product purge bin to downstream operations, which may include extrusion or packaging operations, and will be referred to herein as "polymer finishing."

During polymer finishing, the resulting polymer from such liquid-phase or gas-phase polymerizations can be compounded with additives and/or blended with other polymers to form compositions that can then be used in articles of manufacture. For example, the compounded polymer blend can be extruded through a die to form pelletized polymer resin that can be further processed, such as via injection or blow molding. The additives can include antioxidants, nucleating agents, acid scavengers, plasticizers, stabilizers, anticorrosion agents, blowing agents, ultraviolet light absorbents, quenchers, antistatic agents, slip agents, pigments, dyes and fillers, and cure agents, such as peroxides, among others.

Solids handling is an integral part of the polymer finishing process. Conveyor belts have typically been used for transporting a polymer, for example in form of a polymer powder, from a purge bin to a mixer, where the polymer can be compounded with other polymers and additives. In order to produce polymer compounds consistently having the desired properties, the relative proportions of components to be compounded must be carefully measured, controlled and maintained.

A variety of devices have been used for weighing solids during polymer finishing, including specialized weighing bins, hoppers, and weighing conveyor belts. For example, U.S. Pat. No. 4,395,131 discloses use of a weighing hopper for measuring a weight of a solid, such as a polymer powder, where a screw conveyor may be used to feed the solid to a weighing hopper equipped with a weighing scale.

A weighing bin or hopper can typically provide an accurate measurement of polymer powder mass flow out of the bin in what is referred to as the loss-in-weight measurement. However, the weighing bin method alone does not provide a continuous measurement, as the weighing bin alternates between a filling and a draining stage. Also, the larger the size of the bin or the hopper being used, the lesser the accuracy of the loss-in-weight mass flow rate measurement, as the absolute value of the change in mass inside the bin or hopper may be several magnitudes smaller than the overall mass of the bin or hopper, and thus requiring a different measurement scale. Further, the mass flow rate of a polymer powder leaving the weighing bin, although accurate, may not be the true indication of the polymer flow rate through the downstream conveyor and into the mixer.

Another device for weighing a solid, such as disclosed in U.S. Pat. No. 6,523,721, includes a weighing conveyor belt system having a weighing device, such as a load cell, for weighing the amount of solid material on the conveyor belt. Using the mass of the polymer powder on the conveyor belt, the length of the conveyor belt along which the mass is measured, and the speed of the conveyor belt, the mass flow rate of the polymer powder may be determined However, uneven distribution of the polymer powder on a weighing conveyor belt and unintended movement of the polymer powder on the conveyor belt due to dusting, slipping, or tracking can significantly impact the mass flow rate measurement accuracy of the weighing belt conveyor.

Further, any inaccuracy and/or inconsistency in a mass flow rate measurement of the polymer powder may result in poor controlling of the mass flow rates and/or the mass flow rate ratios of the polymer powder and the other polymers and/or additives, which in turn may result in poor qualify and/or consistency of the finished polymer product.

Accordingly, there exists a need for systems and methods for polymer finishing, including more robust devices for measuring and controlling the mass flow rate of a solid polymer material for mixing with other polymers and/or additives, in order to improve the reliability and accuracy of the equipment and the consistency of the resulting polymer product.

SUMMARY

In one aspect, embodiments disclosed herein relate to a polymer finishing process, including: recovering a polymer powder from a polymerization reactor; feeding the polymer powder to an inlet end of a mass flow screw conveyor, the mass flow screw conveyor including: a housing; at least one helical auger at least partially contained within the housing for conveying the polymer powder axially through the mass flow screw conveyor; and one or more mass measuring devices for determining a mass of polymer powder within at least a portion of the housing; rotating the at least one helical auger to convey the polymer powder axially through the screw conveyor; recovering the polymer powder at an outlet end of the screw conveyor; measuring at least one of a mass of the polymer powder in the screw conveyor and a combined mass of the screw conveyor and the polymer powder within the screw conveyor with the one or more mass measuring devices; and determining a mass flow rate of the polymer powder through the mass flow screw conveyor based on the at least one of the measured mass of the polymer powder in the mass flow screw conveyor and the measured combined mass.

In another aspect, embodiments disclosed herein relate to a system for polymer finishing, including: at least one device for providing a flow of polymer powder to a surge hopper during a filling cycle and not providing a flow of polymer powder during an emptying cycle; a flow line fluidly connecting the surge hopper to a mass flow screw conveyor, the mass flow screw conveyor comprising: a housing; at least one helical auger at least partially contained within the housing for conveying the polymer powder axially through the mass flow screw conveyor; and one or more mass measuring devices for determining a mass of polymer powder within at least a portion of the housing; at least one mass measuring device for determining a mass flow rate of polymer powder from the surge hopper to the mass flow screw conveyor; at least one mass measuring device for determining a mass flow rate of the polymer powder through the mass flow screw conveyor; at least one of a digital control system and a programmable logic controller for: during an emptying cycle, adjusting at least one of a polymer powder feed rate to the mass flow screw conveyor, a rotation speed of the helical auger, and an additive feed rate to the mass flow screw conveyor based on the determined a mass flow rate of polymer powder from the surge hopper to the mass flow screw conveyor; and during a filling cycle, adjusting at least one of a polymer powder feed rate to the mass flow screw conveyor, a rotation speed of the helical auger, and an additive feed rate to the mass flow screw conveyor based on the determined mass flow rate of the polymer powder through the mass flow screw conveyor.

DETAILED DESCRIPTION

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

In one aspect, embodiments disclosed herein relate to a process for polymer finishing. In another aspect, embodiments disclosed herein relate to a process for polymer finishing including measuring a mass flow rate of a polymer powder. In yet another aspect, embodiments disclosed herein relate to a process for at least one of measuring and controlling the mass flow rate of a polymer powder.

As used in embodiments disclosed herein, "polymer powder" refers to a raw polymerization reaction product, or raw polymer, recovered from a polymer purge bin in form of a powder that can be fed to polymer finishing, including extrusion and packaging.

Polymer finishing processes, according to embodiments disclosed herein, may include the use of a mass flow screw conveyor. A mass flow screw conveyor according to embodiments disclosed herein may include: i) a housing; ii) one or more helical augers, each at least partially contained within the housing; for conveying a polymer powder through the conveyor; and iii) one or more mass measuring devices for determining the mass of the polymer powder in at least a portion of the housing of the mass flow screw conveyor. In some embodiments, the mass measuring device may be a weigh scale for measuring a weight of the mass flow screw conveyor and the polymer powder contained within and being transported by the mass flow screw conveyor. In other embodiments, the mass measuring device may be used to measure the weight of only a portion of the mass flow screw conveyor and the contents. The weight of the mass flow screw conveyor, a constant, may be accounted for, allowing for an accurate determination of the total mass of polymer powder within the mass flow screw conveyor, or a portion thereof, and the rate at which the polymer powder is being transported through the mass flow screw conveyor.

Such mass flow screw conveyors may be used to measure and/or control a mass flow rate of a polymer powder through polymer finishing processes according to embodiments disclosed herein. Mass flow screw conveyors may also be incorporated into a polymer finishing process, which may include additional devices to determine polymer powder mass flow rates, to enhance mass flow accuracy and mass flow rate control of polymer powder and additives through the polymer finishing process.

Using a mass flow screw conveyor to measure a mass flow rate of a polymer powder in a polymer finishing process according to embodiments disclosed herein may improve the accuracy and the consistency of the mass flow rate measurement of the polymer powder. For example, using a mass flow screw conveyor may eliminate or substantially reduce the dusting, slipping, tracking, and uneven polymer powder distribution problems that may be faced by conventional mass flow measuring devices, such as weighing conveyor belts.

Measurement and control of the mass flow rate of polymer powder through polymer finishing processes according to embodiments disclosed herein may be solely via mass measurements obtained with one or more mass flow screw conveyors. In other embodiments, measurement and control of the mass flow rate of polymer powder through polymer finishing processes disclosed herein may be via mass measurements obtained with one or more mass flow screw conveyors in association with mass measurements obtained with additional equipment, such as rotary valves, which may control a polymer powder flow rate via rotation speed, as well as surge hoppers and other feed vessels, intermediate the purge bin and the mass flow screw conveyor, having differential weighing devices for measuring a flow rate of polymer from or to the vessel.

The polymer powder may be fed to the mass flow screw conveyor from a purge bin by a variety of methods. In some embodiments, the polymer powder may be fed to the mass flow screw conveyor through a feed valve. The feed valve may provide a continuous supply of polymer powder or it may operate intermittently, thus providing non-uniform feed of polymer powder. In some embodiments, the feed valve may be a rotary valve, screw feeder, belt feeder, or vibrating feeder. In other embodiments, the feed valve may be a chunk-cutting rotary valve. In yet other embodiments, the polymer may be fed to the feed valve directly from the purge bin.

In other embodiments, a surge hopper may be used to directly feed the polymer powder to the mass flow screw conveyor. For example, a surge volume of the polymer powder stored in the surge hopper may be used to provide a continuous feed to the mass flow screw conveyor.

As mentioned above, the helical augers may be used to convey polymer powder axially through the mass flow screw conveyor. In some embodiments, the helical augers may include flights having a uniform pitch (axial distance between flights) along the length of the conveyor. As used in embodiments disclosed herein, "compartment" refers to the open volume between flights that may be filled by polymer powder for transport along the length of the helical auger. In some embodiments, the helical auger may maintain approximately constant compartment filling axially along the length of the screw conveyor, such as with a uniform pitch, and an approximately constant inlet feed rate, such as from a rotary valve or other upstream flow control devices.

In other embodiments, the pitch of the helical auger flights may vary along the length of the conveyor. For example, a helical auger having a pitch at the inlet less than that of the flights proximate the outlet may provide for uniform filling of the helical auger at the inlet, such as 100% filling of the volume between the flights, and due to increased pitch, additional volume between the pitches per mass of polymer is created, providing usable volume within the mass flow screw conveyor for additives to be combined with the polymer powder. For example, the helical auger may be a progressive metering screw for reducing the compartment filling from approximately 100 percent at the inlet end of the mass flow screw conveyor to a fixed compartment filling, such as approximately 50 percent, at the outlet end of the mass flow screw conveyor.

Mass flow screw conveyors according to embodiments disclosed herein may not be as susceptible to the dusting, slipping, tracking and uneven distribution problems as are other polymer powder mass flow measuring devices, for example, belt conveyors. Because the flights of the helical auger do not extend completely to the housing, the accuracy of the determined mass flow rate of polymer powder along the screw conveyor may depend on the amount of slippage of the polymer powder between the flights and the housing (i.e., polymer passing though gaps between a helical auger flight and the housing). However, at steady-rate operation, the slippage rate should not have a significant impact on the mass flow measurement accuracy due to a steady slippage rate.

Polymer finishing processes according to embodiments disclosed herein, using mass flow screw conveyors alone or in conjunction with additional mass measuring devices, such as surge hoppers with a differential weighing device, may provide for a high degree of accuracy with respect to the mass flow rate of polymer powder through the polymer finishing process. In some embodiments, the accuracy of the mass flow measurement may be better than approximately 10 percent (i.e., within the range from −10% to +10% of actual). In other embodiments, the accuracy of the mass flow measurement may be better than approximately 5 percent. In yet other embodiments, the accuracy of the mass flow measurement may be better than approximately 3 percent. In still other embodiments, the accuracy of the mass flow measurement may be better than approximately 1 percent.

The housing of the mass flow screw conveyor may comprise one or more sections. In some embodiments, the housing may be a single-piece solid housing. In other embodiments, the housing may include two or more separate solid housing portions, each connected by a flexible connection means such as a flexible hose. For example, the polymer powder may be conveyed via one or more helical augers through an inlet portion of the housing corresponding to the inlet end of the mass flow screw conveyor, through the flexible connection means, and into an outlet portion of the housing corresponding to the outlet end of the mass flow screw conveyor. This partition of the housing via a flexible connection means may be used to allow for independent mass measurements of the polymer powder inside each portion of the housing using the one or more mass measuring devices, as described below. Separate measurement of the mass flow rate at the inlet and outlet ends may be used for process redundancy, such as in case of a failure of a weigh scale, such as to measure the weight of the mass flow screw conveyor and the polymer powder proximate the inlet end. Separate measurements of the inlet and outlet ends may also provide for a determination of the amount of additives added to the polymer powder, such as where the additives are added proximate the outlet end.

The one or more mass measuring devices may be disposed proximate the housing or a portion thereof for measuring a mass of the polymer powder inside the housing or the portion thereof. In some embodiments, the one or more mass measurements may be further used to calculate a mass flow rate of a polymer powder. In other embodiments, the one or more mass measurements may be used to calculate the mass flow rate of at least one of the polymer powder and another polymer and/or additive. In yet other embodiments, the one or more mass measurements may be used to calculate and/or control the mass flow rate of at least one of the polymer powder and another polymer and/or additive.

A variety of mass measuring devices may be used according to embodiments disclosed herein for measuring a mass of a polymer powder. In some embodiments, the mass measuring device may be a weighing scale. Such weighing scale may include, for example, at least one of a load cell, a spring scale, a strain gauge scale, a hydraulic scale, and a pneumatic scale. In other embodiments, a mass measuring device may include an ultrasonic or a nuclear radiation device. For example, an ultrasonic or a nuclear radiation device may be used to determine a percent volume fill of the polymer powder inside the compartments within the mass flow screw conveyor, which in turn may be used to determine the mass of the polymer powder based on the known density. One or ordinary skill in the art would recognize that other mass measurement devices for measuring the mass of the polymer powder may also be used.

In some embodiments, the one or more mass measuring devices, such as a weighing scale, may be in contact with the housing or the portion thereof In one aspect, the one or more mass measuring devices may be in contact with the bottom surface of the housing or the portion thereof In anther aspect, at least a portion of the screw conveyor may be resting on the one or more weighing scales via the bottom surface of the housing or a portion thereof For example, the one or more weighing scales may initially measure the total mass of the screw conveyor and the polymer powder contained within. The constant mass of the empty screw conveyor may then be subtracted or tared to determine the net mass of the polymer powder inside the screw conveyor.

In some embodiments, the housing may be single-piece, and the one or more weighing scales may be used to measure the mass of the polymer powder contained within the entire housing. For example, the entire housing may be resting on the one or more weighing scales, and therefore the mass measured by the one or more weighing scales may correspond to the total mass of the screw conveyor and the polymer powder within. In other embodiments, the housing may include two or more separate housing portions connected by a flexible connection means, and two or more separate and independent mass measurements may be conducted using two or more weighing scales. For example, the inlet portion of the housing may be resting on a weighing scale to determine only the amount of the polymer powder inside the inlet portion of the housing. The outlet portion of the housing may be resting on another weighing scale to determine only the amount of polymer powder inside the compartments formed by the outlet portion of the housing.

The independent mass measurements of the material inside each of the two or more portions of the housing may be used to measure both the mass of the polymer powder and the mass of any other polymers and/or additives that may be added proximate the outlet end of the screw conveyor during the finishing process. For example, such features may be used to accurately measure the feed ratio between the polymer powder and any other polymers and/or additives in order to produce a high-quality and high-consistency finished polymer.

The independent mass measurements taken simultaneously at the inlet end of the mass flow screw conveyor and the outlet end of the mass flow screw conveyor may also be used to calculate the average compartment filling along the length of the helical auger. In some embodiments, the average compartment filling may be used to determine the mass flow rate of the polymer powder inside the screw conveyor, as described below.

A variety of methods may be used to determine a mass flow rate of the polymer powder using mass measurements produced by the one or more mass measuring devices. For example, the specific mass flow rate calculation method may depend on the compartment filling profile during the measurement process. In some embodiments, the compartment filling may be uniform in the axial direction along the length of the mass flow screw conveyor. For example, a feed valve may operate continuously to feed the polymer powder to the screw conveyor at a constant rate. The axial length of the housing or a portion thereof, and thus the number of compartments contained therein, across which the mass of polymer powder may be measured, is fixed. Thus, a polymer powder mass per unit length of the housing or per compartment may be calculated. The rotation speed of the conveying screw may be used to calculate an axial displacement velocity of the polymer powder inside the screw conveyor as either a displacement length per unit time or a number of compartments per unit time. The mass flow rate of the polymer powder in the screw conveyor may then be calculated using the mass of the polymer powder per unit length or per compartment and the axial displacement velocity of the conveying screw.

In other embodiments, the compartment filling may not be uniform in the axial direction along the mass flow screw conveyor. The non-uniform compartment filling may be due to interruptions or inconsistencies in the polymer powder feed to the screw conveyor and/or may be due to changes in the rotation speed of the conveying screw. For example, a feed valve may cycle between open and closed positions, thus feeding the polymer powder to the screw conveyor at a non-uniform rate. Temporary bridging of polymer particles within the transport piping or proximate the inlet to the mass flow screw conveyor may also result in non-uniform filling. Two or more independent mass measurements may be conducted axially along the length of the housing or portions thereof using two mass measuring devices. For example, the housing may include two or more separate housing portions connected by flexible connecting means, each equipped with one or more mass measuring devices, as described above. In one embodiment, one mass measurement may be made at the inlet portion of the housing and another mass measurement may be made at the outlet portion of the housing. Two or more independent mass flow rates may be calculated for each housing portion, as described above. Since the compartment filling may not be uniform, neither one of the two or more independent mass flow rate calculations by itself may be accurate. However, the two or more independent mass flow rate calculations made at each housing portion may then be averaged to determine the average mass flow rate of the polymer powder throughout the mass flow screw conveyor. Calculating an average mass flow rate based on average compartment filling, where non-uniform filling proximate the inlet is likely to occur, may provide better accuracy and consistency.

In yet other embodiments, the compartment filling profile may be both uniform at the inlet end of the mass flow screw conveyor, but non-uniform over the length of the mass flow screw conveyor. For example, the compartment filling profile using a progressive metering screw may change from approximately 100 percent filling at the inlet to approximately 50 percent filling proximate the outlet end of the screw conveyor. As described above, a mass measurement of the polymer powder contained only in the portion of the housing having uniform compartment filling may be made. For example, a mass measurement may be made at or proximate the outlet end of the mass flow screw conveyor having a progressive metering screw. The mass flow rate may then be determined as described above with increased accuracy, as the compartment filling throughout that housing portion may be uniform, as compared to an assumed uniformity.

The specific configuration and mechanical design of the mass flow screw conveyor may vary depending on the supply mode of the polymer powder from the purge bin to the mass flow screw conveyor. For example, the type of conveyor screw, the type of housing, the placement of mass measurement devices, the method for calculating a mass flow rate, and the method for controlling a mass flow rate and/or feed ratio of various components may depend on whether the polymer powder is fed from the purge drum to the mass flow screw conveyor continuously or intermittently, and whether a surge hopper is provided at the inlet to the screw conveyor. As described above, the mass measurement and determination of polymer powder mass flow rates may be likewise varied to account for such upstream operations. Additionally, mass flow screw conveyors may be incorporated into a polymer finishing process, including additional devices to determine polymer powder mass flow rates, to enhance mass flow accuracy and flow rate control.

Figure 1:
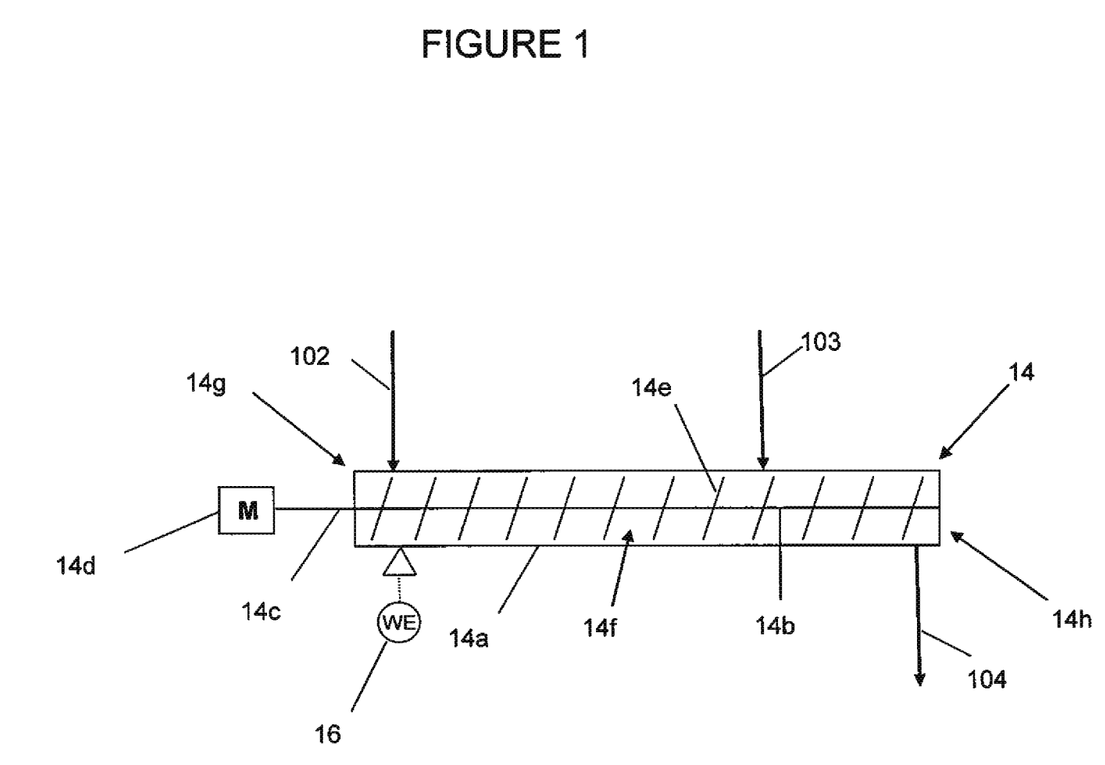
FIG. 1 is a simplified flow diagram of a polymer finishing process according to embodiments disclosed herein.

Referring now to FIG. 1, a simplified flow diagram of a system for polymer finishing according to embodiments disclosed herein is illustrated. Mass flow screw conveyor 14, as noted above, may include a housing 14a, and a helical auger 14b, which may be rotated by shaft 14c and motor 14d. Helical auger 14b may have several flights 14e, between which may be formed "compartments" 14f, as defined above, for transporting polymer powder from inlet end 14g to outlet end 14h. A polymer powder may be fed to inlet end 14g of mass flow screw conveyor 14 via flow line 102, such as from the purge bin or a surge hopper (not shown). The polymer powder may then at least partially fill the space between flights 14e (i.e., compartments 14f), and rotation of the helical auger may result in the axial transport of polymer toward outlet 104.

At least one device 16 for measuring the mass of at least a portion of the mass flow screw conveyor 14 and the polymer powder within the mass flow screw conveyor 14 is provided. As described above, the filling of compartments 14f may be fixed, calculated, or estimated. Using a weight measurement obtained from device 16, a given empty or tare weight, the compartment filling percentage, helical auger characteristics (L/d, etc.), and rotation speed of the helical auger, the mass flow rate of polymer powder from inlet end 14g toward outlet end 14h may be determined.

In some embodiments, polymer powder may be fed at a desired rate to flow line 104 for admixture with additives or further processing downstream, where weigh device 14 may be used to control the flow rate of polymer powder. In other embodiments, polymer powder provided by flow line 102 may be mixed inside mass flow screw conveyor 14 with other polymers and/or additives fed via flow line 103. For example, additives may be fed proximate outlet end 14h of mass flow screw conveyor 14. Polymer powder admixed with other polymers and/or additives may be recovered from the outlet end 14h of mass flow screw conveyor 14 via flow line 104. Weighing device 16, allowing for determination of the mass flow rate of polymer powder within mass flow screw conveyor 14, may be used to accurately determine and control the feed rate of polymer powder via inlet 102 and/or the feed rate of additives via flow line 103, thus resulting in a desired ratio of polymer powder to the additives fed. This may provide a robust way to continuously measure a mass flow rate of a polymer powder through polymer finishing processes according to embodiments disclosed herein, including high measurement accuracy and good reliability.

Figure 2:
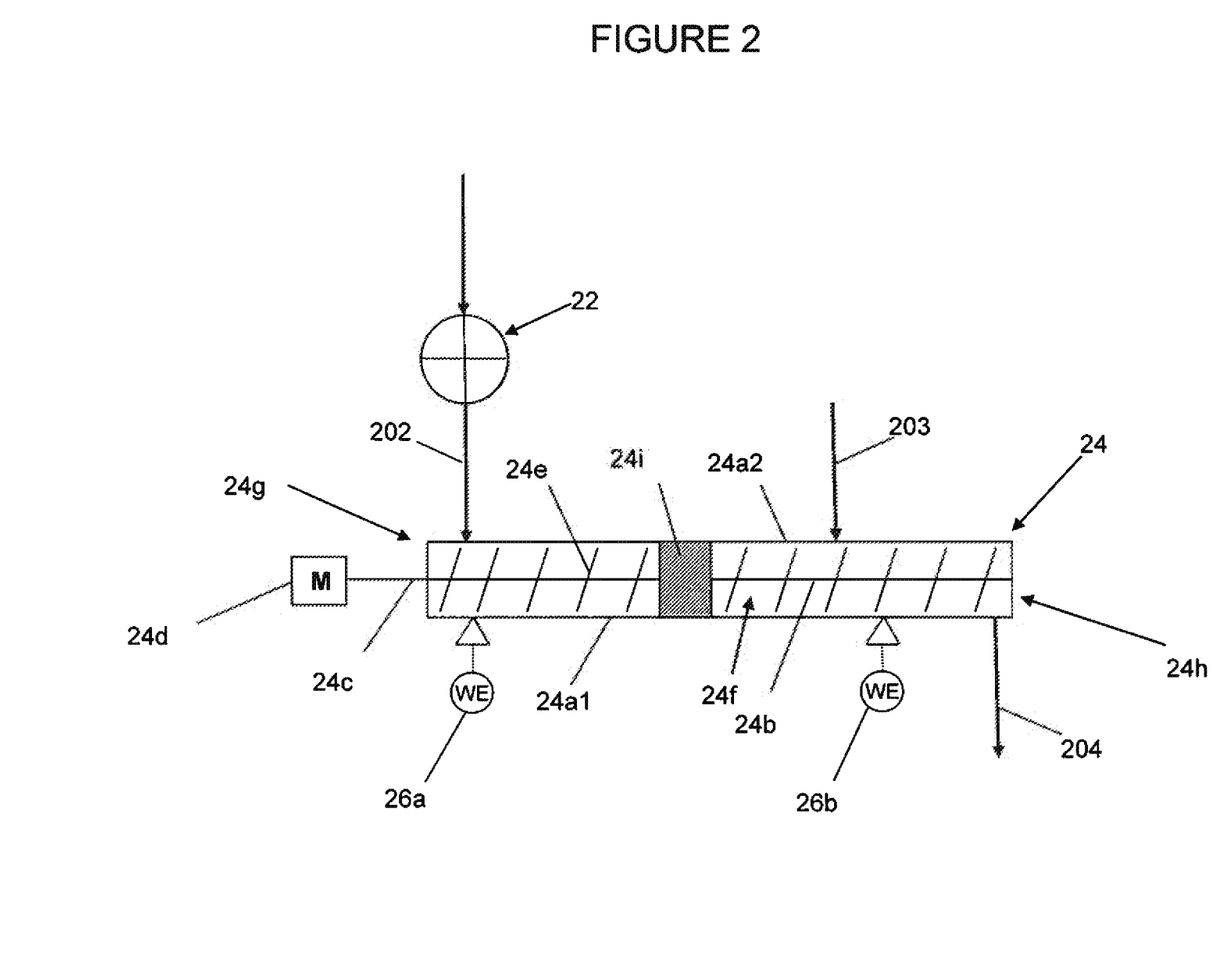
FIG. 2 is a simplified flow diagram of a polymer finishing process according to embodiments disclosed herein.

Referring now to FIG. 2, a simplified flow diagram of a system for polymer finishing according to embodiments disclosed herein is illustrated. Mass flow screw conveyor 24 may include a housing 24a (24a1 and 24a2), and a helical auger 24b, which may be rotated by shaft 24c and motor 24d. Helical auger 24b may have several flights 24e, between which may be formed compartments 24f for transporting polymer powder from inlet end 24g toward outlet end 24h. In this embodiment, the housing of mass flow screw conveyor 24 may include two housing portions: inlet housing portion 24a1 and outlet housing portion 24a2, connected to each other by flexible connecting means 24i. Such an arrangement may allow for redundant measurement of polymer powder mass flow rates, or separate measurement of polymer powder mass flow rates and additive flow rates, such as where the additive is fed to outlet housing portion 24a2, as well as advanced determination and control of the polymer powder and additive feed rates and ratios.

A polymer powder may be fed to inlet end 24e of mass flow screw conveyor 24 via flow line 202, such as from the purge bin or a surge hopper (not shown), where the flow of polymer may be regulated via valve 22, such as a rotary valve. The polymer powder may then at least partially fill the space between flights 24e (i.e., compartments 24f), and rotation of the helical auger may result in the axial transport of polymer toward outlet 204.

Inlet housing portion 24a1 may rest on at least one first mass measuring device 26a, which may be used to measure or determine a mass of the polymer powder only inside the inlet housing portion 24a1 of mass flow screw conveyor 24. Outlet housing portion 24a2 may rest on at least one second mass measuring device 26b, which may be used to measure or determine a mass of the polymer powder only inside the outlet housing portion 24a2 of mass flow screw conveyor 24. As described above, individual mass flow rates inside each housing portion may be determined based on individual mass measurements by first mass measuring device 26a and second mass measuring device 26b, respectively.

When used for redundancy, the separate mass measuring devices 26a and 26b may provide for continued measurement should one or the other fail. Additionally, an average mass flow rate along the entire mass flow screw conveyor 24 may be determined using the individual mass flow rate measurements. In one aspect, this average mass flow rate may provide a higher degree of accuracy for the mass flow rate measurement.

Additionally, when other polymers and/or additives may be added via flow line 203, for example, first mass measuring device 26a may be used to determine the mass flow rate of polymer powder supplied to inlet housing portion 24a1. Simultaneously, second mass measuring device 26b may be used to determine the mass flow rate of the polymers and/or additives supplied to outlet housing portion 24a2 via flow line 203, as described above. For example, a combined mass flow rate of the polymer powder and the other polymers and/or additives may be measured by second mass measuring device 26b. The mass flow rate of polymer powder simultaneously measured by first mass measuring device 26a may then be subtracted to determine the mass flow rate of the other polymers and/or additives fed via flow line 203. Further, a ratio of the mass flow rate of the polymer powder fed via flow line 202 to the mass flow rate of the polymers and/or additives fed via flow line 203 may be calculated and controlled to produce a high-quality finished polymer.

Three or more housing portions may also be used. The housing portions may be equipped with one or more weighing scales for independently measuring a mass flow rate, as describe above, as necessary or desired. Such independent mass measurements may be used to calculate the corresponding mass flow rates of the polymer powder and the multiple additives, allowing independent determination and control of the respective feed rates and feed ratios.

Figure 3:
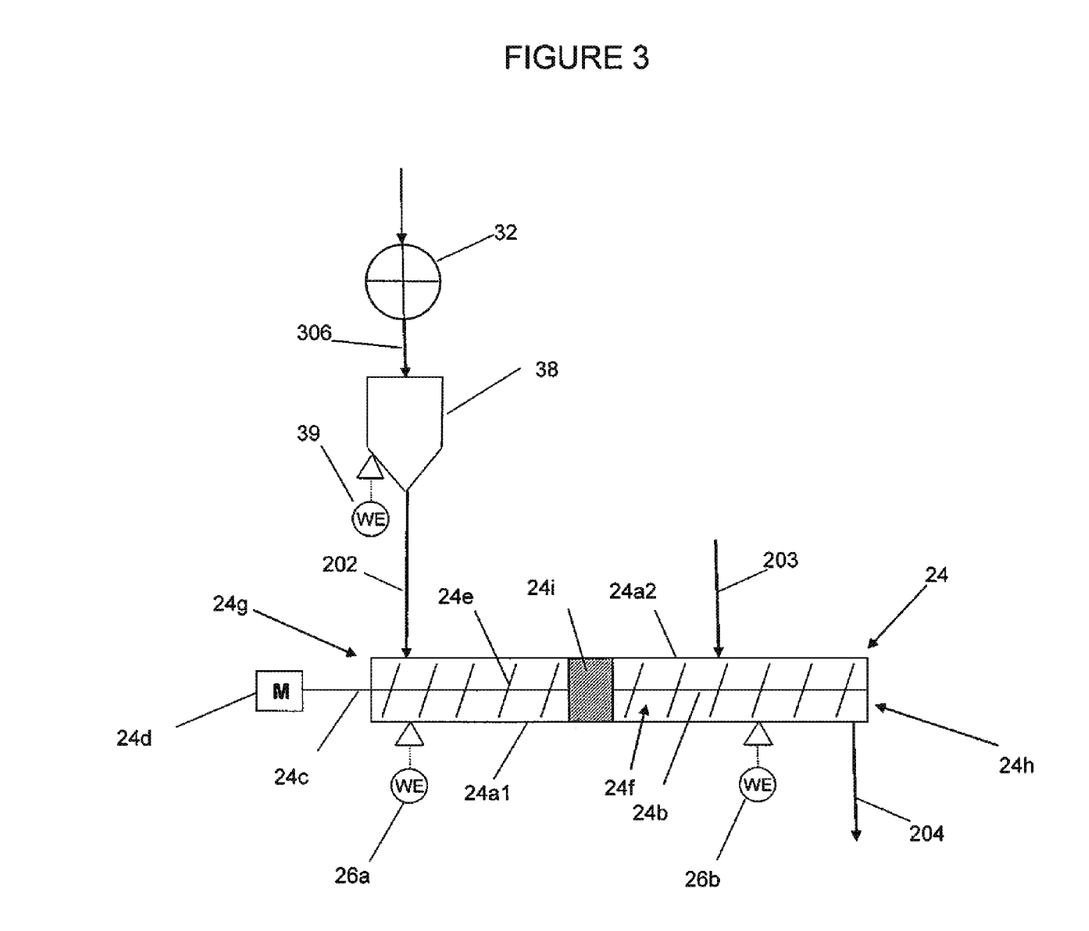
FIG. 3 is a simplified flow diagram of a polymer finishing process according to embodiments disclosed herein.

Referring now to FIG. 3, a simplified flow diagram of a system for polymer finishing according to embodiments disclosed herein is illustrated, where like numerals represent like parts. Prior to feeding mass flow screw conveyor 24, the polymer from valve 32 may be fed to a surge hopper 38 via flow line 306. Surge hopper 38 may be used to maintain a surge volume of the polymer powder for feeding mass flow screw conveyor 24. For example, the surge volume in surge hopper 38 may compensate for short-term interruptions in polymer powder flow from valve 32. A volume of polymer powder in the surge hopper may provide a continuous supply of polymer powder to the mass flow screw conveyor, allowing for upstream transitions, downtime, or other events that may interrupt or necessitate stoppage of flow to or from valve 32. The mass flow rate of the polymer powder may be controlled by adjusting the rotation speed of the one or more helical augers while maintaining level in the surge hopper.

In some embodiments, such as shown in FIG. 3, the surge hopper 38 may also be equipped with one or more mass measuring devices 39 to measure a mass of the polymer powder inside the surge hopper. As an example, upon filling of surge hopper 38 via rotation of valve 32, mass measuring devices 39 may be used to measure a decrease in weight of surge hopper 38 and its contents (i.e., a loss-in-weight measurement). Such mass measurements or differential mass measurements may be used, for example, to calibrate the mass flow screw conveyor, as an alternative means to measure the mass flow rate of the polymer powder, and/or to additionally control a mass flow rate of the polymer powder through polymer finishing processes according to embodiments disclosed herein. A variety of mass measurement devices may be used to measure the mass of polymer powder within surge hopper 38, including but not limited to: weighing scales, load cells, ultrasonic instruments, and nuclear radiation instruments. Other types of mass measuring devices may also be used.

In some embodiments, the one or more mass measuring devices 39 may be disposed proximate the surge hopper. In other embodiments, the one or more mass measuring devices 39 may be in contact with the surge hopper to facilitate the desired measurement. In yet other embodiments, the surge hopper 38 may rest on the one or more mass measuring devices 39. For example, the surge hopper 38 may rest on a weighing scale. The weighing scale may measure a combined mass of the surge hopper and the polymer powder inside the surge hopper. The empty weight of the surge hopper may then be subtracted to determine the mass of the polymer powder inside the hopper 38.

A variety of mass measurement methods may be used, depending on the operating mode of the surge hopper 38. In some embodiments, surge hopper 38 may operate in a continuous mode, with the polymer powder being continuously fed from a feed valve 32 into the surge hopper 38, and from the surge hopper 38 into the mass flow screw conveyor 24. During such operation, the net mass of polymer powder within the surge hopper 38 may remain relatively constant.

In other embodiments, the surge hopper 38 may alternate between a filling mode and a draining mode. For example, in the filling mode, the polymer powder may be fed to the surge hopper 38 via the feed valve 32, until the surge hopper 38 is filled to a desired level. In the draining mode, the feed valve 32 may be closed to stop the flow of the polymer powder into the surge hopper 38, and the polymer powder continues to flow from the surge hopper 38 into the mass flow screw conveyor 24.

As the mass of the polymer powder inside the surge hopper 38 increases during the filling cycles, the weighing device 39 may not provide for continued measurement of polymer powder mass flow rates through the polymer finishing process. In such instances, the redundancy of weighing devices 26a/b may provide such measurements, ensuring control of polymer powder to additive ratios throughout both the filling and drainage cycles. During drainage cycles, the change in the mass of the surge hopper 38 may be used to determine the mass flow rate of the polymer powder through the mass flow screw conveyor 24, thus allowing for calibration or direct measurement of the polymer powder mass flow rate, as desired or necessary.

Thus, mass flow measurements within polymer finishing processes disclosed herein may provide additional flexibility to the polymer finishing process, such as by combining the mass measurements made using the mass flow screw conveyor with the loss-in-weight measurement made using the surge hopper, including various instrument calibration and/or cross-validation capabilities.

In addition to measuring a mass flow rate of polymer powder through polymer finishing processes, embodiments disclosed herein may also be used for enhanced control of the mass flow rates and/or feed ratios of the polymer powder and/or one or more additives supplied to the polymer finishing process. As discussed above, maintaining accurate and consistent component ratios throughout the finishing process is crucial to the quality of the finished polymer product.

Figure 4:
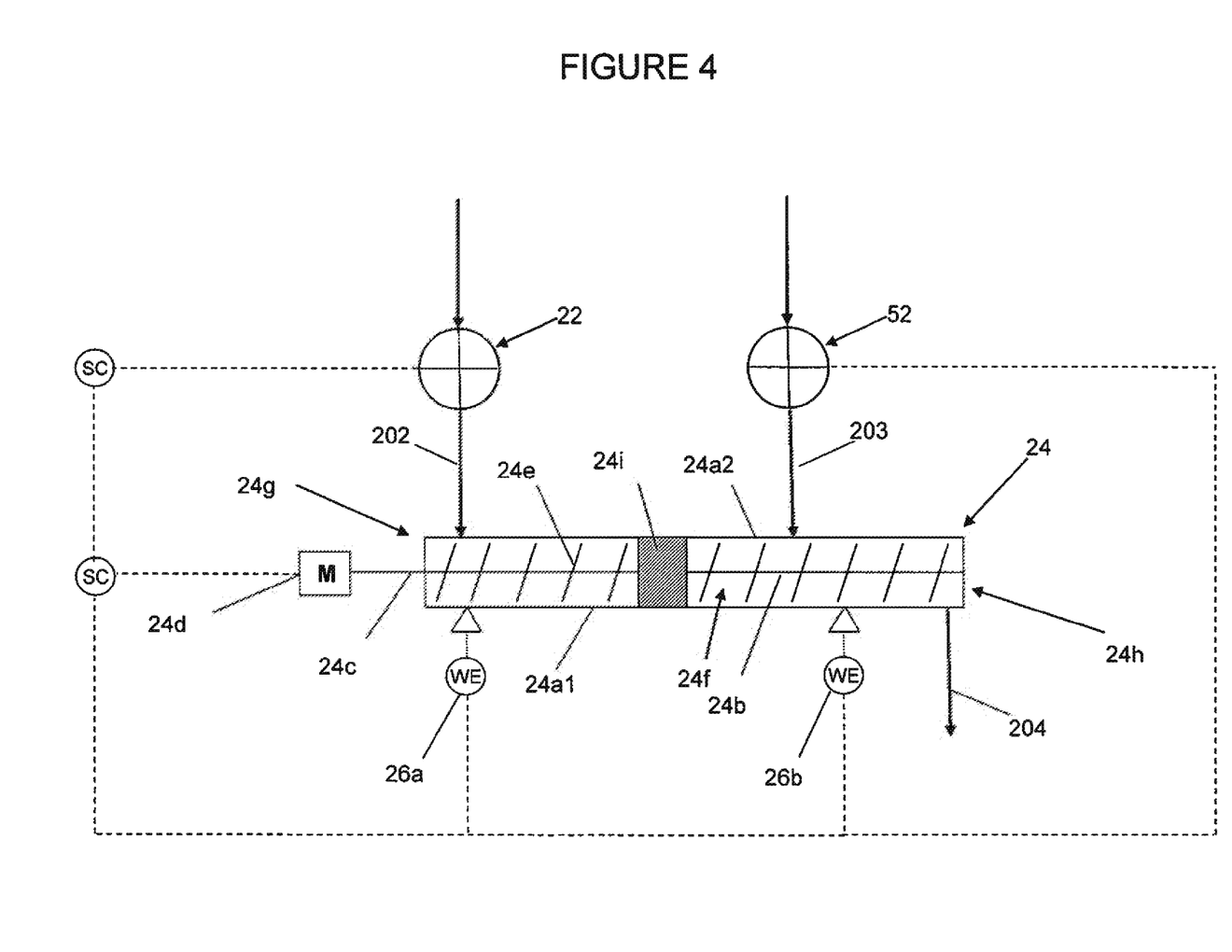
FIG. 4 is a simplified flow diagram of a polymer finishing process according to embodiments disclosed herein.

Referring now to FIG. 4, a simplified flow diagram of a system for polymer finishing, including one possible control scheme, according to embodiments disclosed herein is illustrated, where like numerals represent like parts. The mass flow rate of a polymer powder through mass flow screw conveyor 24 may be measured using a weighing device 26a, as described above. The measurement output from device 26a may be routed to a Programmable Logic Controller (PLC), a digital control system (DCS) or similar devices, or may be manually controlled by an operator. The output may then be used to directly or indirectly control, for example, the rotation speed of the helical augers 24b to control the mass flow rate of polymer powder through the system. In other embodiments, the position and/or rotation speed of feed valve 22 may be adjusted using the output from measuring devices 26a and/or 26b. In yet other embodiments, both the feed valve 22 and the speed of helical augers 24b may be adjusted to control the mass flow rate of polymer powder through the polymer finishing process.

If one or more other polymers and/or additives are added during the polymer finishing process via flow line 203, second mass measuring devices 26b may be used to control its flow rate by adjusting the rotation speed and/or position of additives valve 52. The mass measuring devices 26a may simultaneously measure the flow rate of the polymer powder. A calculated ratio of the flow rates of each component may then be used to control the component ratios in the finished polymer product, thus providing an accurate and consistent means to control component ratios during polymer finishing, producing a high quality, consistent, finished polymer product.

Figure 5:
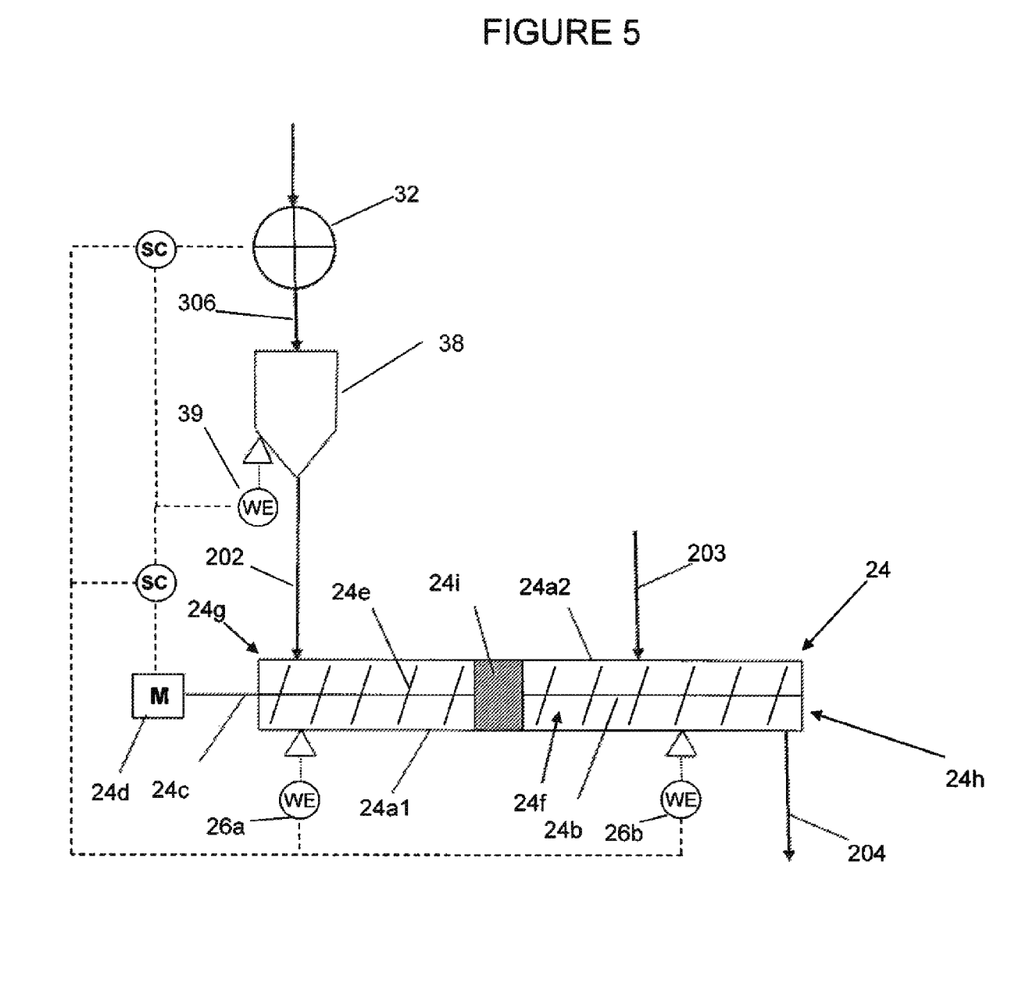
FIG. 5 is a simplified flow diagram of a polymer finishing process according to embodiments disclosed herein.

Referring now to FIG. 5, a simplified flow diagram of a system for polymer finishing according to embodiments disclosed herein is illustrated, where like numerals represent like parts. Mass measurement device 39 for measuring a mass of surge bin 38 may also be used to control the mass flow rate of a polymer powder through the polymer finishing process. In some embodiments, the mass flow rate of a polymer powder may be controlled using output from at least one of: a mass measuring device 26a, a mass measuring device 26b, and a mass measuring device 39. For example, at least one of the mass flow rate measurements may be used to control the polymer powder flow rate by adjusting the rotation speed of helical augers 24b and/or feed valve 32.

In other embodiments, a mass flow rate of a polymer may be controlled by a feed forward loop. For example, the rotation speed of helical augers 24b may be controlled based on output from feed valve 32, thus controlling a mass flow rate of the polymer powder in mass flow screw conveyor 24. Also, for example, a mass flow rate measurement using mass measurement device 39 can be used to control the rotation speed of helical augers 24b. Other types of feed forward mass flow rate control can also be used.

These methods for controlling a mass flow rate of the polymer may provide additional flexibility to the polymer finishing process by combining the mass measurements made using the mass flow screw conveyor with the loss-in-weight measurement made using the surge hopper, including various instrument calibration and/or cross-validation capabilities.

Referring still to FIG. 5, controlling a mass flow rate of the polymer powder may advantageously alternate between using mass measuring devices 26a/b and mass measuring device 39. For example, when surge hopper 38 is in filling mode, first and/or second mass measuring device 26a/b may be used to control a mass flow rate of the polymer powder by controlling the rotation speed of helical auger 24b.

As surge hopper 38 switches from the filling mode to the draining mode, feed valve 32 closes, and mass measuring device 39 may again be used to control a mass flow rate of the polymer by controlling the rotation speed of helical auger 24b.

These embodiments illustrate additional flexibility of using a combination of the loss-in-weight and the weight screw conveyor mass flow measurements. For example, both types of measurements may be used in combination when the surge hopper is in the draining mode. When the surge drum is in the filling mode, the mass flow screw conveyor measurements alone may be used.

Figure 6:
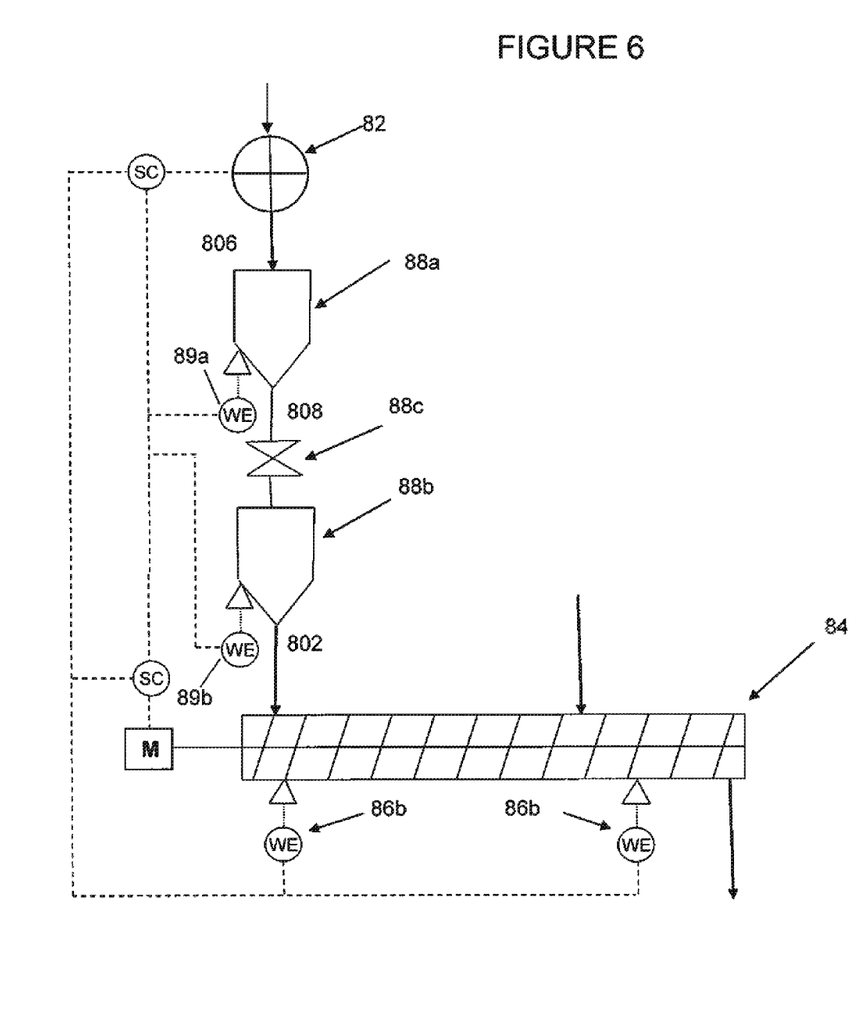
FIG. 6 is a simplified flow diagram of a polymer finishing process according to embodiments disclosed herein.

Referring now to FIG. 6, a simplified flow diagram of a polymer finishing process according to embodiments disclosed herein is illustrated. A polymer powder may be fed from feed valve 82 via flow line 806 to first surge hopper 88a having at least one mass measuring device 89a. The polymer powder from first surge hopper 88a may be fed via flow line 808 to second surge hopper 88b having at least one mass measuring device 89b. The polymer powder from the second surge hopper 88b may be fed to mass flow screw conveyor 84 via flow line 802. Isolation valve 88c located on flow line 808 between first surge hopper 88a and second surge hopper 88b may be used to stop the flow of the polymer powder from first surge hopper 88a into second surge hopper 88b.

In some embodiments, isolation valve 88c may be a slide valve. Other types of isolation valves may also be used. In some embodiments, the polymer from feed valve 82 may be sent through a screener in order to achieve a better particle size distribution by separating large chunks and sheets. In some embodiments, feed valve 82 may be a chunk-cutting rotary valve followed by the screener. In other embodiments, feed valve 82 may be a chunk cutting separating rotary valve. Other types of feed valves and screeners can also be used.

In some embodiments, isolation valve 88c may be open, whereby the polymer powder may flow through first surge hopper 88a and second surge hopper 88b directly into mass flow screw conveyor 84. In other embodiments, isolation valve 88c may be closed, whereby first surge hopper 88a may operate in a filling mode and second surge hopper 88b may operate in a draining mode. At least one mass measuring device 89a may be used to determine a mass flow rate of the polymer powder into first surge hopper 88a using a gain-in weight method. For example, with isolation valve 88c closed, at least one second mass measuring device 89a may measure the change in mass of the polymer powder in first surge hopper 88a over time. Similarly, at least one mass measuring device 89b may be used to calculate a mass flow rate of the polymer powder out of second surge hopper 88b using a loss-in weight method, as previously described. For example, with isolation valve 88c closed, at least one mass measuring device 89b may measure the change in mass of the polymer in second surge hopper 88b over time.

These embodiments may provide further flexibility of the mass measurements during the polymer finishing process. In some embodiments, a mass flow rate measurement of the polymer using at least one of loss-in-weight and gain-in-weight methods may be used for equipment calibration. For example, the measurement may be used to calibrate the rotation speed of (mass flow rate through) at least one of feed valve 82 and helical auger, as described above. In other embodiments, a mass flow rate measurement of the polymer powder using at least one of loss-in weight and gain-in weight methods may be used to control, for example, the rotation speed of at least one of feed valve 82 and the at least one helical auger. As with FIG. 5, the loss-in-weight measurements from devices 86a/b may be supplemented with output from weighing devices 86a/b to allow control of the polymer finishing process, even during surge bin fill cycles.

Processes for polymer finishing according to embodiments disclosed herein, as illustrated in FIGS. 1-6 and described above, may offer a variety of advantages over the traditional polymer finishing processes. For example, the robust equipment and control schemes that may be employed using embodiments disclosed herein may provide for a high degree of accuracy and reliability with regard to polymer powder and/or additive feed control. Further, embodiments disclosed herein may provide for continuous process control, even when surge bins are in a fill cycle.

Additionally, systems and processes according to embodiments disclosed herein may be implemented via retrofitting existing processing equipment in a polymer finishing facility. For example, existing polymer finishing facilities may already have at least one of a purge bin, a rotary chunk cutting valve, a surge hopper, and a screw conveyor. A mass measuring device according to embodiments disclosed herein may be installed to measure the mass of the polymer in an existing screw conveyor and the existing surge hopper to measure the mass flow rate of the polymer powder.

Another advantage of using systems and processes according to embodiments disclosed herein is that they may improve the polymer finishing process by producing more accurate mass flow rate measurements than the traditional mass measurement devices. For example, using a mass flow screw conveyor according to embodiments herein makes the mass flow measurement less susceptible to error due to dusting and tracking, which are commonly-occurring problems with traditional weighing belt conveyors, for example.

Another advantage of using processes according to embodiments disclosed herein is that the accuracy and reliability of the mass flow rate measurement of the polymer powder may be further increased by calibrating the weigh screw conveyor against a second source, such as a loss-in-weight measurement from a surge bin. For example, measuring a mass flow rate of a polymer powder using a mass flow screw conveyor can be combined with data from one or more weighing bins according to embodiments disclosed herein in order to calibrate or recalibrate the mass flow rate measurements and thus achieve higher accuracy than either the weighing bin or the weighing belt conveyor can achieve alone.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

Only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed:

1. A polymer finishing process comprising:
    recovering a polymer powder from a polymerization reactor;
    feeding the polymer powder to an inlet end of a mass flow screw conveyor, the mass flow screw conveyor comprising:
        a housing;
        at least one helical auger at least partially contained within the housing for conveying the polymer powder axially through the mass flow screw conveyor; and
        one or more mass measuring devices for determining a mass of polymer powder within at least a portion of the housing;
    rotating the at least one helical auger to convey the polymer powder axially through the screw conveyor;
    recovering the polymer powder at an outlet end of the screw conveyor;
    measuring at least one of a mass of the polymer powder in the screw conveyor and a combined mass of the screw conveyor and the polymer powder within the screw conveyor with the one or more mass measuring devices;
    determining a mass flow rate of the polymer powder through the mass flow screw conveyor based on the at least one of the measured mass of the polymer powder in the mass flow screw conveyor and the measured combined mass; and
    feeding at least one additive to the mass flow screw conveyor intermediate an inlet end and an outlet end of the mass flow screw conveyor;
    measuring a mass of the polymer and the at least one additive within the outlet end of the mass flow screw conveyor using a second mass measuring device.

2. The process of claim 1, wherein the polymer powder comprises at least one of a polyethylene and a polypropylene polymer.

3. The process of claim 1, wherein the determining comprises:
    determining an average mass of the polymer powder in the mass flow screw conveyor per unit length of the at least a portion of the housing the measured mass of the polymer powder;
    determining an axial displacement velocity of the polymer powder caused by the rotating of the at least one helical auger using a rotation speed thereof;
    determining the mass flow rate of the polymer powder based on the average mass per unit length and the axial displacement velocity.

4. The process of claim 1, further comprising:
    adjusting the mass flow rate by adjusting a rotation speed of the one or more helical augers in response to the determined mass flow rate of the polymer powder.

5. The process of claim 1, further comprising:
    determining a mass flow rate of the at least one additive based upon the measured mass of the polymer and the at least one additive within the outlet end;
    calculating a ratio of the mass flow rate of the polymer powder to the mass flow rate of the at least one additive based upon the determined mass flow rate of the polymer and the mass flow rate of the at least one additive;
    adjusting at least one of a polymer powder feed rate to the mass flow screw conveyor, a rotation speed of the helical auger, and an additive feed rate to the mass flow screw conveyor based on the calculated ratio.

6. The process of claim 1, further comprising:
    filling a surge hopper with the polymer powder;
    stopping a flow of polymer powder to the surge hopper;
    feeding the polymer powder from the surge hopper to the inlet end of the mass flow screw conveyor;
    measuring a mass of the polymer powder in the surge hopper using at least one mass measuring device; and
    determining a mass flow rate of polymer powder from the surge hopper to the mass flow screw conveyor as a function of the decrease in the measured mass in the surge hopper over time.

7. The process of claim 6, further comprising:
    generating a calibration curve for the mass flow rate of polymer through the mass flow screw conveyor as a function of helical auger rotation speed based upon the determined mass flow rate of polymer powder from the surge hopper to the mass flow screw conveyor.

8. The process of claim 6, further comprising:
    when a flow of polymer powder to the surge hopper is stopped, adjusting at least one of a polymer powder feed rate to the mass flow screw conveyor, a rotation speed of the helical auger, and an additive feed rate to the mass flow screw conveyor based on the determined a mass flow rate of polymer powder from the surge hopper to the mass flow screw conveyor; and
    during the filling of the surge hopper with the polymer powder, adjusting at least one of a polymer powder feed rate to the mass flow screw conveyor, a rotation speed of the helical auger, and an additive feed rate to the mass flow screw conveyor based on the determined mass flow rate of the polymer powder through the mass flow screw conveyor.

9. A system for polymer finishing, wherein said polymer finishing system is used for the polymer finishing process of claim 1, said polymer finishing system comprising:
    at least one device for providing a flow of polymer powder to a surge hopper during a filling cycle and not providing a flow of polymer powder during an emptying cycle;
    a flow line fluidly connecting the surge hopper to a mass flow screw conveyor, the mass flow screw conveyor comprising:
        a housing;
        at least one helical auger at least partially contained within the housing for conveying the polymer powder axially through the mass flow screw conveyor; and one or more mass measuring devices for determining a mass of polymer powder within at least a portion of the housing;

at least one mass measuring device for determining a mass flow rate of polymer powder from the surge hopper to the mass flow screw conveyor;

at least one mass measuring device for determining a mass flow rate of the polymer powder through the mass flow screw conveyor;

at least one of a digital control system and a programmable logic controller for:

during an emptying cycle, adjusting at least one of a polymer powder feed rate to the mass flow screw conveyor, a rotation speed of the helical auger, and an additive feed rate to the mass flow screw conveyor based on the determined a mass flow rate of polymer powder from the surge hopper to the mass flow screw conveyor; and during a filling cycle, adjusting at least one of a polymer powder feed rate to the mass flow screw conveyor, a rotation speed of the helical auger, and an additive feed rate to the mass flow screw conveyor based on the determined mass flow rate of the polymer powder through the mass flow screw conveyor.

* * * * *